April 19, 1927.

C. P. EISENHAUER 1,625,198

AUTOMATIC WATER SOFTENER

Filed Oct. 12, 1925

INVENTOR
CHARLES P. EISENHAUER
BY
ATTORNEYS

April 19, 1927.
C. P. EISENHAUER
1,625,198
AUTOMATIC WATER SOFTENER
Filed Oct. 12, 1925
4 Sheets-Sheet 2
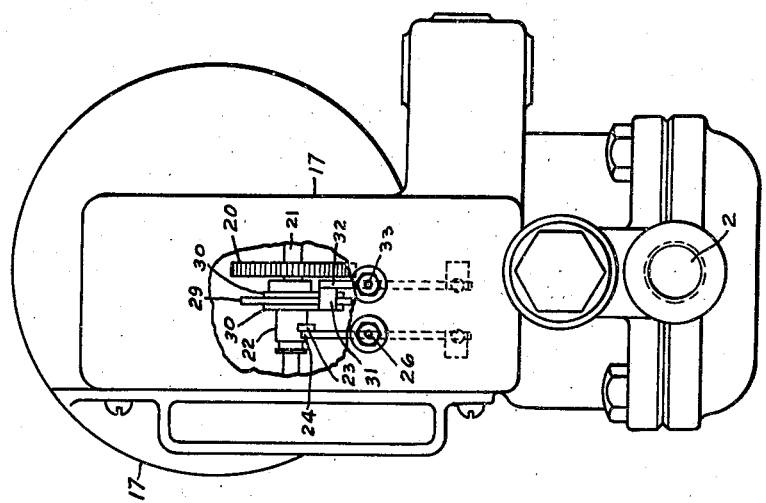
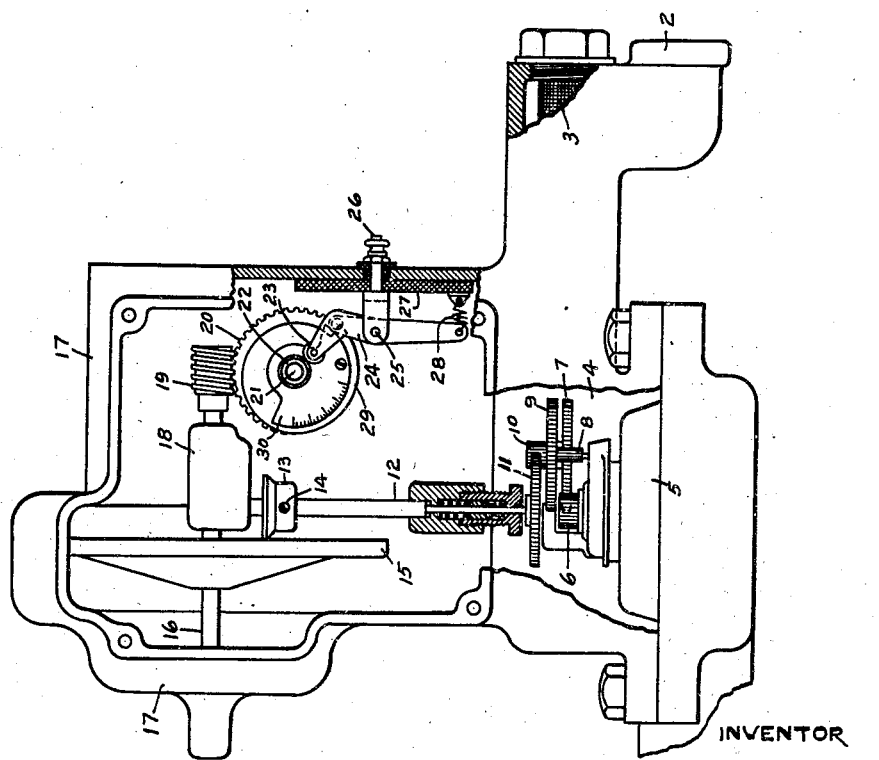
INVENTOR
CHARLES P. EISENHAUER.
BY Toulmin Toulmin
ATTORNEYS

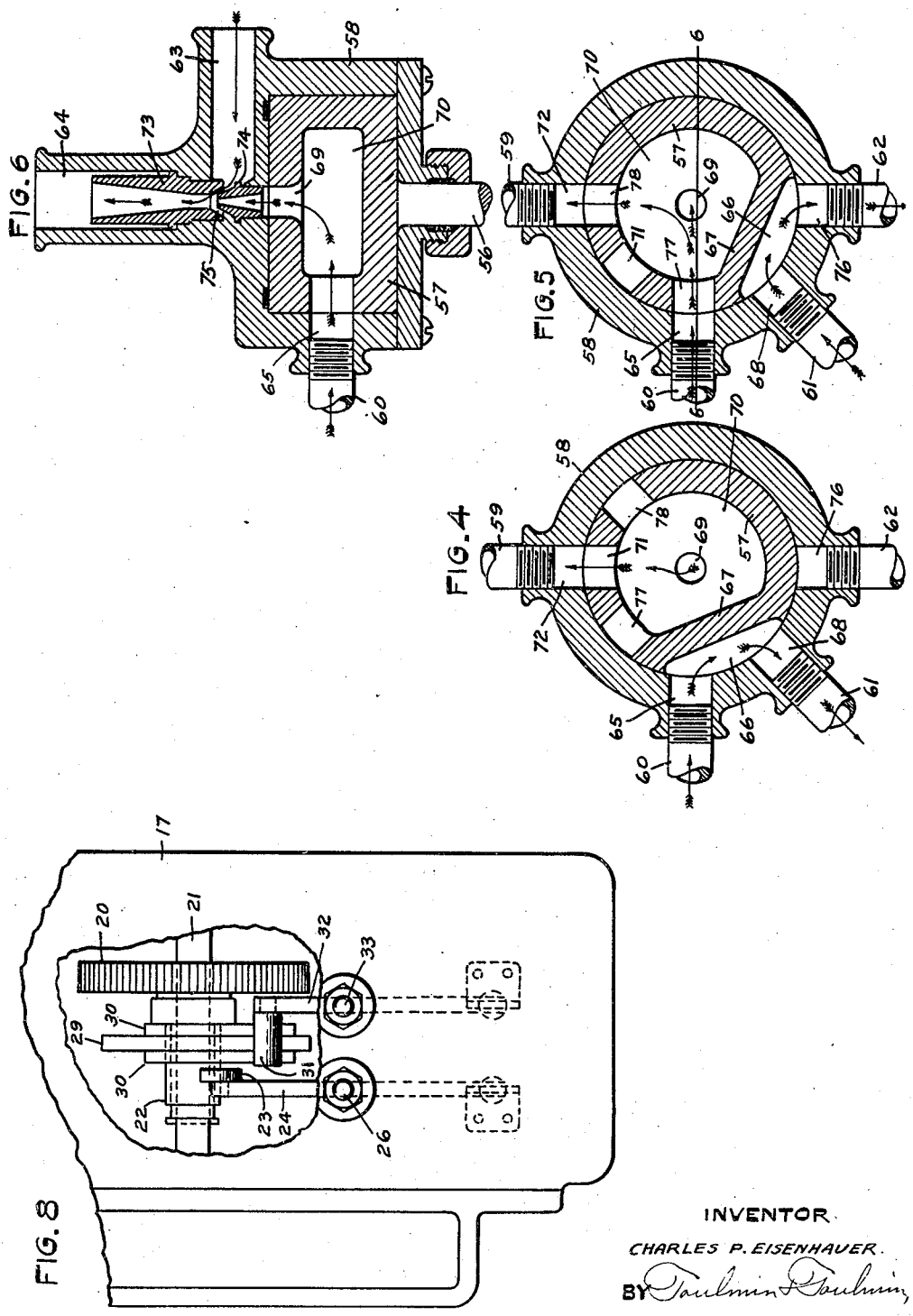

April 19, 1927.

C. P. EISENHAUER 1,625,198

AUTOMATIC WATER SOFTENER

Filed Oct. 12, 1925

INVENTOR
CHARLES P. EISENHAUER.
BY
ATTORNEYS

Patented Apr. 19, 1927.

1,625,198

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

AUTOMATIC WATER SOFTENER.

Application filed. October 12, 1925. Serial No. 62,000.

It is the object of my invention to provide an automatic water softener in which the periods of regeneration and softening are controlled according to the amount of water passing through a water controlling apparatus such as a meter, which in turn operates mechanism for making and breaking electrical contacts, for making or breaking a circuit for energizing a solenoid which controls a master needle valve. This solenoid, through the needle valve, controls the application of hydrostatic pressure to diaphragm valves, and a hydrostatically operated diaphragm mechanism which operates a rotary valve, controls the direction of flow of the fluid through the softening material and controls the application of brine, controls the by-passing of hard water and supply of replenishing water to a brine tank.

The hydrostatic pressure also operates diaphragm valves in this invention, controlling the refill and brine valves, the period of whose operation is controlled by a float mechanism associated with the brine tank, which float controls a locking system on the refill valve, and application of hydrostatic pressure to the brine valve.

It is my object to provide mechanism of this character in which the water flows upwardly for softening and downwardly for regeneration.

In the accompanying drawings:

Figure 2 is a section through the casing containing the meter and electrical contact mechanism;

Figure 3 is an end elevation of such a casing partially broken away to show the form of electrical contacts;

Figure 4 is a section taken vertically through the rotary valve, showing the valve in softening position;

Figure 5 is a similar view, showing the valve in regenerating position;

Figure 6 is a view of the valve on the line 6—6 of Figure 5, showing the valve in regenerating position;

Figure 8 is an enlarged view of the electrical contact mechanism.

Figure 1:
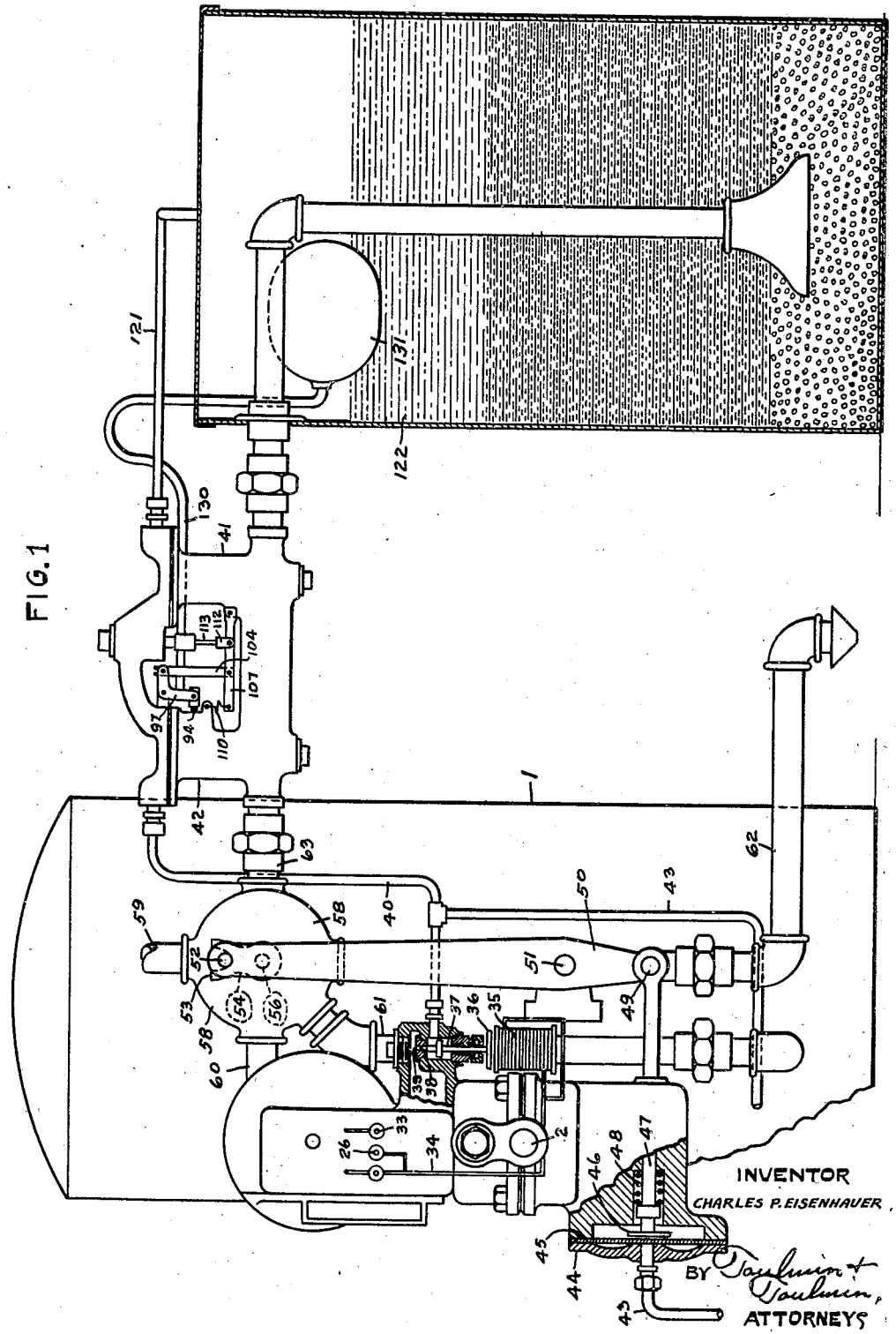
Figure 1 is a side elevation, partially in section, of the complete apparatus.

Referring to the drawings in detail, 1 is a softening tank to which water is supplied through the main supply pipe 2 which passes through a screen 3 into the meter chamber 4 where it actuates the meter 5. This results in moving the train of gears 6, 7, 8, 9, 10 and 11 resulting in the actuation of the shaft 12. This shaft carries a button driving member 13 adjustably mounted on the shaft by the screw 14. This driving member drives a driven disk 15, which, in turn, is mounted on a shaft 16 journaled at one end in the housing 17 and at the other end in a bracket 18 which is a part of the housing. This shaft 16 carries a worm 19 adapted to engage with a worm wheel 20. This worm wheel is carried on a shaft 21 which is journaled in the side walls of the casing 17. On this shaft is a sleeve 22 of metallic material on which the rotor 23 carried by the rocker arm 24 rides. This rocker arm is pivoted at 25 and is connected electrically to the terminal 26. It is mounted on the insulating plate 27. The other end of the rocker arm is connected to a helical spring 28, one end of which is connected to the insulating plate 27. On this shaft and sleeve is mounted a cam 29 which is thus in electrical contact with the rotor 23 through the sleeve 22. Associated with this metallic cam 29 are a pair of insulating disks 30 on either side thereof which are adapted, through their high portion, to lift a second rotor 31 off the metallic cam 29, except during the period of regeneration. This second rotor 31 is carried on an arm 32 similarly mounted and connected to a terminal 33. Thus, when the last mentioned rotor 31 is on the metallic cam 29, a circuit is made and the terminals 26 and 33 are connected to a source of current such as the ordinary house line for domestic current in a household. The terminal 26 is connected to a wire 34 and thence to a coil 35 of a solenoid, the armature 36 of which is connected to a valve stem 37 having a needle valve head 38 for controlling an aperture 39 through which the water flows under pressure through the pipes 40 to the brine valve 41 and refill valve 42, and through the pipe 43 to the main diaphragm valve 44. This valve contains a diaphragm 45 adapted to engage with a diaphragm head 46 of a plunger 47. This plunger is moved in the other direction by a spring 48. The free end of this plunger is pivoted at 49 to a lever 50 pivoted on the tank 1 at 51. The other end of this lever is connected to the cross pin 52 in the jaws 53 of a lever 54 which operates the rod 56 on which is mounted the rotor 57 in the valve casing 58 of the main rotary valve. This rotary valve is provided with a pipe to household service marked 59, a pipe from the inlet water 60, a pipe 61 to the bottom of the tank 1, a pipe to drain 62, a brine line 63. The line 64 leads to the top of the tank.

Turning to the main rotary valve, it will be observed that the city water or hard water enters through the port 65 of the rotor casing, through the passageway 66 to one side of the rotor wall 67, out the port 68 in the rotor casing into the pipe 61 to the bottom of the softener, thence upwardly through the softening material, which is retained between screens, in a manner which I prefer to employ, as shown in my application Serial No. 41,580, and thence to the top of the tank through the pipe 64, through the opening 69 into the rotor chamber 70, through the port 71 in the rotor port 72 in the rotor casing, into the pipe 59, out to service. If the water is flowing just after regeneration, then a portion of this water passing through the pipe 64 will be diverted between the two members with restricted openings 73 and 74 which have a space therebetween marked 75, so that a part of the water can pass through to the brine line 63 and into the brine tank, as will be hereinafter described.

If the rotary valve is in regenerating position, then the water passes through the pipe 60, port 65, chamber 70, through the opening 69 into the top of the tank, through the pipe 64 down through the mineral drawing with it brine through the pipe 63, thence upwardly through the pipe 61 by the port 68, passageway 66, port 76 into the pipe 62 to drain. Simultaneously with this movement, the city water is proceeding through the port 65 out of the pipe 59 to service in order to supply the service line with hard water during regeneration period. The water passes through the port 65 into the port 77 of the rotor for this purpose, out through the port 78 of the rotor. The action of the water passing through the opening 69, through the injector mechanism 74 and 73 draws brine from the brine tank through the pipe 63.

Turning to the refill valve and brine valve, it will be noted that the pipe 63 is connected to a tubular casting having valve structures mounted on either end of it, which casting is divided near its ends by diagonal partitions 79 and 80 which form supports for the valve seats 81 and 82 of the refill valve member 83 and the brine valve member 84. The valve member 83 is mounted on a valve stem 85 passing through spring-pressed packing 86 to a point where it carries a locking plate 87 and a diaphragm head 88 on which the diaphragm 89 may rest when it is expanded by the pressure in the diaphragm chamber 90 from the pipe 40. This valve is held in its uppermost position by the spring 91, one end of which engages with the plate 87 and the other end of which rests on a shoulder 92 on the valve casing 93. The locking mechanism consists of a locking plunger 94 working in the frame of the casting 95 surrounding the valve, and is held in one direction by the spring 96 and the other end is held by an arm 97 of a bell crank which is pivoted at 98 on the frame or casting 98$^a$. The connection between the plunger 94 and the arm 97 consists of a pin 99 carried by the bifurcated ends 100 of the arm 97. The other end of this bell crank has an arm designated 101 with bifurcated ends 102 for receiving the jaws 103 of a link 104. Between these jaws is a pin 105 working in the slot between them. The lower end of the link 104 is pivoted at 106 to a lever 107, one end of which is pivoted at 108 on the frame 109 of the brine valve, while the other end is supported by a spring 110, one end of which is hooked on the frame 95. Between the pivotal points 108 and 106 there is pivoted at 111 a link 112 which is connected to a valve stem 113 controlling the ball valve 114. Spring-pressed packing 115 surrounds this valve stem. This ball controls the passageway 116 which leads from the diaphragm chamber 90 over the refill valve to the diaphragm chamber 117 over the diaphragm 118 of the brine valve. This diaphragm chamber 117 is adapted to exhaust its liquid contents through the screen 119, the bleed opening 120 in the pipe 121 which drains into the top of the brine tank 122.

The brine valve has a broad diaphragm head 123 carried on the valve stem 124 which also carries a plate 125 against which rests the spring 126 for keeping the valve normally open. The other end of this spring rests on a shoulder 127 on a part of the sleeve 128 in which is placed the packing 129.

Connected to the bell crank arms 101 and 97, which bell crank is pivoted at 98, on the frame 98$^a$, is a float arm 130 on the free end of which is a float 131 resting in the brine tank.

Method of operation.

In operating this device the water passes through the meter 5, drives the meter 5 so that the shaft 12 is driven. This drives the driving member 13, which in turn drives disk 15 on the shaft 16. The variation of the position of the driving member 13 with respect to disk 15 will vary the relative speeds of the shafts 12 and 16. This results in rotating the metallic cam 29 and the non-metallic cams 30 so that when the circuit is broken, that is, when the non-metallic cams 30 are in engagement with the rotor 31, the apparatus is working on softening water, but when the circuit is made and the current is applied to the solenoid 35 that opens the needle valve 37 allowing hydrostatic pressure to work on the valve 44 moving the lever 50 and turning the rotor 57 of the valve 58 so that the water will be reversed in its direction, salt will be drawn with it to the top of the tank 1, thence downwardly, thence upwardly to the valve 58 and then down to drain 62, while, at the same time, a portion of the incoming hard water is diverted to service line 59. In order to permit the salt water to be drawn from the brine tank 122 when this hydrostatic pressure is applied, it passes through the pipe 40 into the valve chamber 90, depressing the diaphragm 89 and the valve member 83, through the valve stem 85. The float 131 is then in its uppermost position and the valve member 84 is open and is normally open so that the salt water can flow through the pipe 63 as desired.

Figure 7:
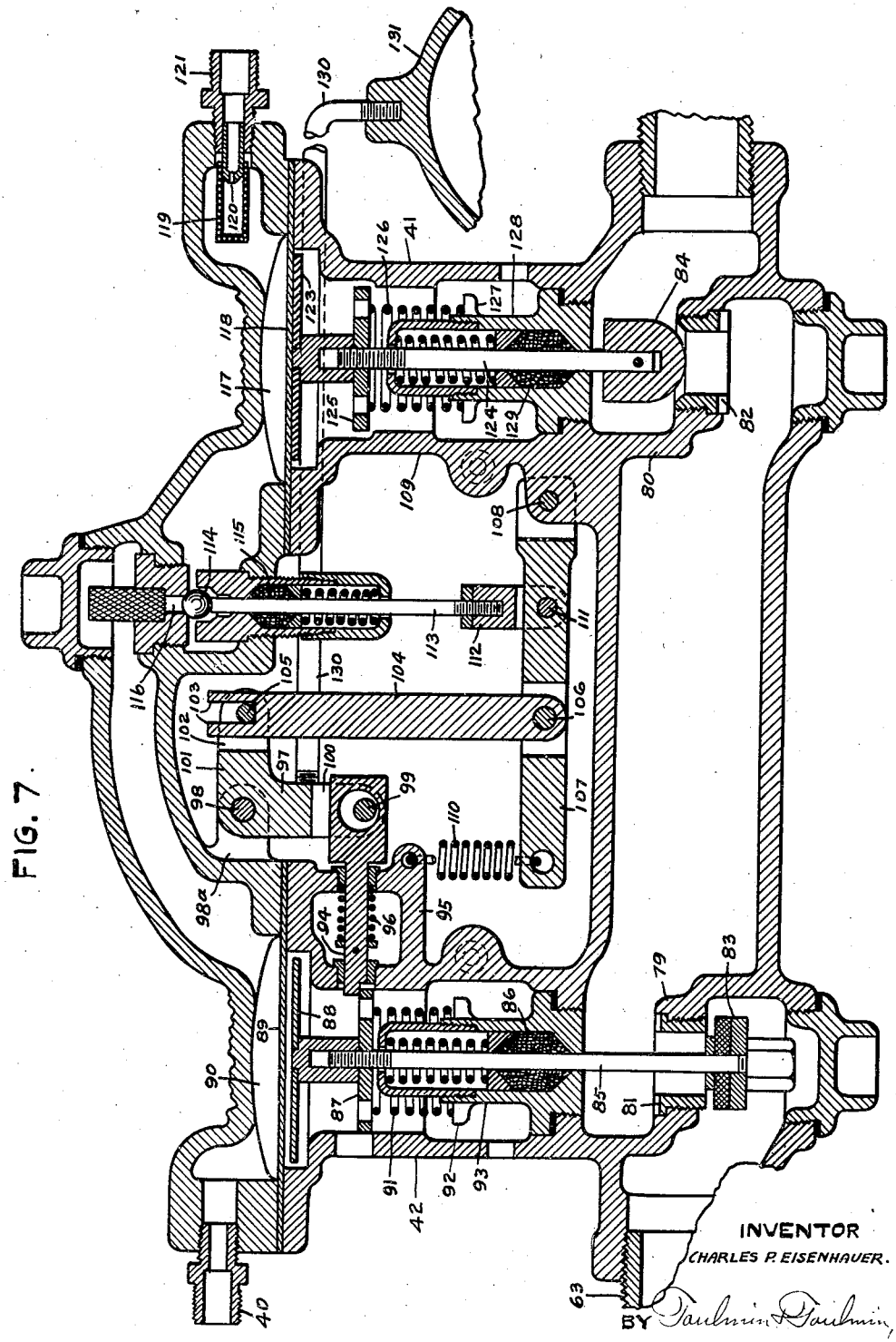
Figure 7 is a section through the unitary construction of the refill valve and brine valve.

When the predetermined amount of salt water is moved through the pipe by that time, the float 131 is dropped down to a predetermined point. In doing so, it has carried with it the bell cranks 97 and 101 to a point shown in Figure 7, where it is just engaging with the jaws 103 in the link 104. As it descends, it carries with it the valve stem 113 and the ball 114 allowing the hydrostatic pressure to enter into the diaphragm chamber 119 so that the diaphragm 118 will engage with the head 123 forcing the valve member 84 shut, shutting off the brine.

In the meanwhile, as soon as the refill valve 42 was forced open by the hydrostatic pressure, the locking plunger 94 was forced into locking position over the plate 87 by the spring 96. Thus, this valve 83 is locked open. After the salt water is shut off, the hard water continues to flow downwardly to wash the tank 1, of salt water and to wash the softening material free from salt water. By that time, the meter 5 will have moved the cam mechanism 29 and 30 to a point where the contacts will be again broken and the system again restored to softening position. When this occurs, the hydrostatic pressure will be relieved behind the diaphragm 118 allowing this valve 84 to open. Thus, both valves 83 and 84, shown in Figure 7, will be open at this moment. A part of the water which is then flowing to service line 59 will be diverted to the pipe 63 to replenish the brine tank 122 with water. This gradually results in lifting the float 131 to a point where it will move the bell crank arm 97 so that it will pull the plunger 94 against the spring 96 unlocking the valve 83 and permitting it to close. Thus, this action shuts off the delivery of any further water to the brine tank, which is not desired.

It will be understood that I desire to comprehend within my invention such modifications as may be necessary to adapt it to varying conditions and uses.

Having thus fully described my invention, what I claim as new and desire to secure by Letters Patent, is:

1. In a water softener, a container for softening means, a container for regenerating means, means controlled by the passage of water through the system for regulating the period of regeneration and softening, an electrical circuit adapted to be made and broken by said means, a needle valve controlled by said electrical circuit, and hydrostatic valves controlled by the hydrostatic pressure passing by said needle valve, said valves being adapted to operate valves for converting the softener from softening position to regenerating position and back to softening position.

2. In a water softener, a container for softening means, a container for regenerating means, means controlled by the passage of water through the system for regulating the period of regeneration and softening, an electrical circuit adapted to be made and broken by said means, a needle valve controlled by said electrical circuit, and hydrostatic valves controlled by the hydrostatic pressure passing by said needle valve, said valves being adapted to operate valves for converting the softener from softening position to regenerating position and back to softening position, and for the supplying of regenerating material in predetermined quantities and for replenishing the regenerating means with fresh water in predetermined quantities.

3. In a water softener, a container for regenerating means, means operated by the application of hydrostatic pressure for converting the system from softening position to regenerating position and back to softening position, a control means to control said application of hydrostatic pressure, means controlled by the incoming hard water for determining the period when such conversion will take place, an electrical circuit, electrical means adapted to be energized for such purpose to actuate said control means.

4. In a water softener, a container for softening means, a container for regenerating means, a water meter, circuit break and make mechanism operated thereby, a needle valve, means to operate said needle valve connected to said circuit, diaphragm valves adapted to be operated by hydrostatic pressure passing through said needle valve, a hydrostatically operated diaphragm mechanism to operate a rotary valve, a rotary valve adapted to regulate the period of softening and the period of regeneration, other diaphragm valves being adapted to regulate a refill valve and a brine valve, a lock for the refill valve, a needle valve to control the brine valve a float means associated with the brine tank for regulating the application of hydrostatic pressure to the brine valve and for unlocking the refill valve, and the brine tank.

5. In a water softener, a softening tank, means to supply water to either end thereof, a brine supply, a water meter, means driven thereby for making and breaking an electrical circuit, an electrical circuit, a solenoid connected therein, a needle valve connected to the solenoid, a diaphragm valve operated by pressure passing through the needle valve, a system of levers connected therewith, a rotary valve operated thereby, a refill valve, a lock therefor, a brine valve, a needle valve for controlling the application of hydrostatic pressure to the brine valve, diaphragm valves for said brine valve and needle valve operated by said hydrostatic pressure, float mechanism associated with the brine tank adapted to control the needle valve for the brine valve and unlock the refill valve, said rotary valve being so arranged that it will deliver water to one end of the softening tank and out the other during softening, and during regeneration, reverse the direction of the water, drawing salt water in the tank at the reverse end and out the other to drain, and a drain.

6. In a water softener, a softening tank, an incoming hard water line, meter mechanism operated by the incoming hard water, means driven by the meter to operate make and break mechanism, mechanism for operating make and break contacts, an electrical circuit connected thereto, a solenoid in said circuit, a needle valve controlled by said solenoid, a diaphragm valve, a lever operated by said diaphragm to operate a rotary valve, a rotary valve adapted to divert the water to one end of the softener and to reverse the direction during regeneration, drawing brine from the brine tank, injector means associated with the rotary valve, a brine tank, and brine line, a diaphragm refill valve and a diaphragm brine valve connected to said needle valve and adapted to be operated by said hydrostatic pressure, a lock for the refill valve, said needle valve controlling the application of hydrostatic pressure to the diaphragm valves operating the brine valve, and a float mechanism associated with the brine tank for operating said needle valve and said lock.

7. In a water softener, a container for softening means, a container for regenerating means, a valve for converting the softener from regenerating position to softening position and back to regenerating position, a meter in the incoming hard water line actuated by the flow of hard water in the line, a driving member and a driven member actuated by the meter, means to make and break an electrical circuit driven by said driven member, a solenoid connected in said circuit, a needle valve operated thereby adapted to control the admission of hydrostatic pressure from the incoming hard water line to hydrostatically operated diaphragm mechanism, a hydrostatically operated diaphragm mechanism having a plunger, a lever connected thereto at one end and a rotary valve to the other end, a rotary valve, a refill valve and a brine valve, said refill valve and brine valve adapted to be operated by hyrostatic pressure, float mechanism associated with the brine valve and refill valve, a lock on the refill valve, a second needle valve controlling the application of hydrostatic pressure to the brine valve.

In testimony whereof, I affix my signature.

CHARLES P. EISENHAUER.